(12) United States Patent
Cuervo

(10) Patent No.: US 6,405,182 B1
(45) Date of Patent: *Jun. 11, 2002

(54) SYSTEM FOR DISPENSING PREPAID DEBIT CARDS THROUGH POINT-OF-SALE TERMINALS

(76) Inventor: Vincent Cuervo, 1545 Miller Rd., Coral Gables, FL (US) 33146-2309

(*) Notice: Subject to any disclaimer, the term of this patent is extended or adjusted under 35 U.S.C. 154(b) by 0 days.

This patent is subject to a terminal disclaimer.

(21) Appl. No.: 09/524,496
(22) Filed: Mar. 13, 2000

Related U.S. Application Data

(63) Continuation-in-part of application No. 09/128,088, filed on Aug. 3, 1998, now Pat. No. 6,105,009.

(51) Int. Cl.[7] .............................................. G06F 17/60
(52) U.S. Cl. ........................ 705/43; 705/16; 705/17; 705/35; 705/39; 705/42; 235/375
(58) Field of Search ............................... 705/41–44, 17, 705/35–39, 23, 413, 16; 235/375–381; 221/7

(56) References Cited

U.S. PATENT DOCUMENTS

| | | | | |
|---|---|---|---|---|
| 5,696,908 A | * | 12/1997 | Muehlberger et al. | 705/39 |
| 5,769,269 A | * | 6/1998 | Peters | 221/7 |
| 5,895,457 A | * | 4/1999 | Kurowski et la. | 705/413 |
| 5,991,748 A | * | 11/1999 | Taskett | 705/41 |
| 6,055,521 A | * | 4/2000 | Ramsey et al. | 705/413 |
| 6,105,009 A | * | 8/2000 | Cuervo | 405/43 |
| 6,116,505 A | * | 9/2000 | Withrow | 235/381 |

FOREIGN PATENT DOCUMENTS

| | | | | |
|---|---|---|---|---|
| JP | 57-17076 | * | 1/1982 | 705/35 |
| JP | 6-4727 | * | 1/1994 | 705/16 |

OTHER PUBLICATIONS

PR Newswire, Nov. 4, 1997, Sims Communications Receives Funding.*

* cited by examiner

Primary Examiner—Richard Chilcot
(74) Attorney, Agent, or Firm—J. Sanchelima

(57) ABSTRACT

Point-of-Sale machines that allow individuals to obtain from participating merchants, "over-the-counter", prepaid debit cards. The amount of the line of credit is determined from the amount prepaid and credited to the debit card issuer, as payment for a simple purchasing transaction of merchandise or services. In this case the transaction is the purchasing of a prepaid PIN (personal identification number) required debit card.

The prepaid debit cards will be instantly available and dispensed in different dollar amounts, after payment of the prepaid amount (line of credit) selected, and the purchaser has input required particular information and those of the transaction which are merged with one of the unique identification numbers and transmitted to a remote computer facility that acts as clearing house for the users' transactions. The remote facility, the debit card issuer, includes input and output means to communicate with the point-of-sale terminal (debit card dispenser location) and the associated circuitry to obtain the identification numbers of the debit cards being dispensed and the particulars of the users and the transactions. Adequate software is provided in the remote facility to permit users to access the same line of credit opened for one or more debit cards so that different users can remotely access and affect one or more lines of credit.

7 Claims, 2 Drawing Sheets

SYSTEM FOR DISPENSING PREPAID DEBIT CARDS THROUGH POINT-OF-SALE TERMINALS

OTHER RELATED APPLICATIONS

The present application is a continuation-in-part of allowed and of U.S. patent application Ser. No. 09/128,088, filed on Aug. 3, 1998 to be issued under U.S. Pat. No. 6,105,009 on Aug. 15, 2000, which is hereby incorporated by reference.

BACKGROUND OF THE INVENTION

The present invention relates to a system for dispensing prepaid debit cards through computerized point-of-sale (POS) terminals.

This business process invention relates to merchants' point-of-sale terminals (POS) becoming sellers and dispensers of debit cards, and more particularly, to those that are computerized.

DESCRIPTION OF THE RELATED ART

The applicant believes that the closest reference corresponds to U.S. Pat. No. 5,696,908 issued to Muehlberger in 1997 for a telephone debit card dispenser and method. However, it differs from the present invention because it does not disclose the use of point-of-sale terminals (POS) to provide an injection on stacked "virgin" debit cards of any selected prepaid amount of funds (line of credit), security information (PINs, passwords, mother's maiden name, etc). And to include conditions for the validation and availability of those funds or line of credit.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a system for selling, dispensing and administering credit or debit cards that require a minimum of paperwork, maintenance and financial disclosure from the card purchaser.

It is another object of this invention to provide a system that permits a user to acquire such debit or credit cards from widely available Point-of-Sale terminals using cash, debit and/or credit cards, check cards or ATM's cards.

It is yet another object of the present invention to permit a user to obtain more than one debit card associated with same identifying serial number for accepting deposits and withdrawals to readily effect transfers of funds to remote locations, including foreign countries, and to the card issuer to selectively offer valuable incentives to a user for either using or not the debit or credit card, in specific situations or geographical areas.

It is still another object of the present invention to provide a system that is portable from one POS terminal to another, or to an ATM machine, and that permits utilizing this business process in the daily commerce for the use of bank cards in payment of merchandise or services or for the refunds of return of merchandise purchased or services requested by the user of the bank card which becomes dissatisfied with them.

Further objects of the invention will be brought out in the following parts of the specifications, wherein detailed description is for the purpose of fully disclosing the invention without placing limitations thereon.

BRIEF DESCRIPTION OF THE DRAWINGS

With the above and other related objects in view, the invention consists in the details of combinations of electronic transactions which will be more fully understood from the following description, when read in conjunction with the accompanying drawings in which.

DETAILED DESCRIPTION OF THE PREFERRED EMBODIMENT

Figure 1:
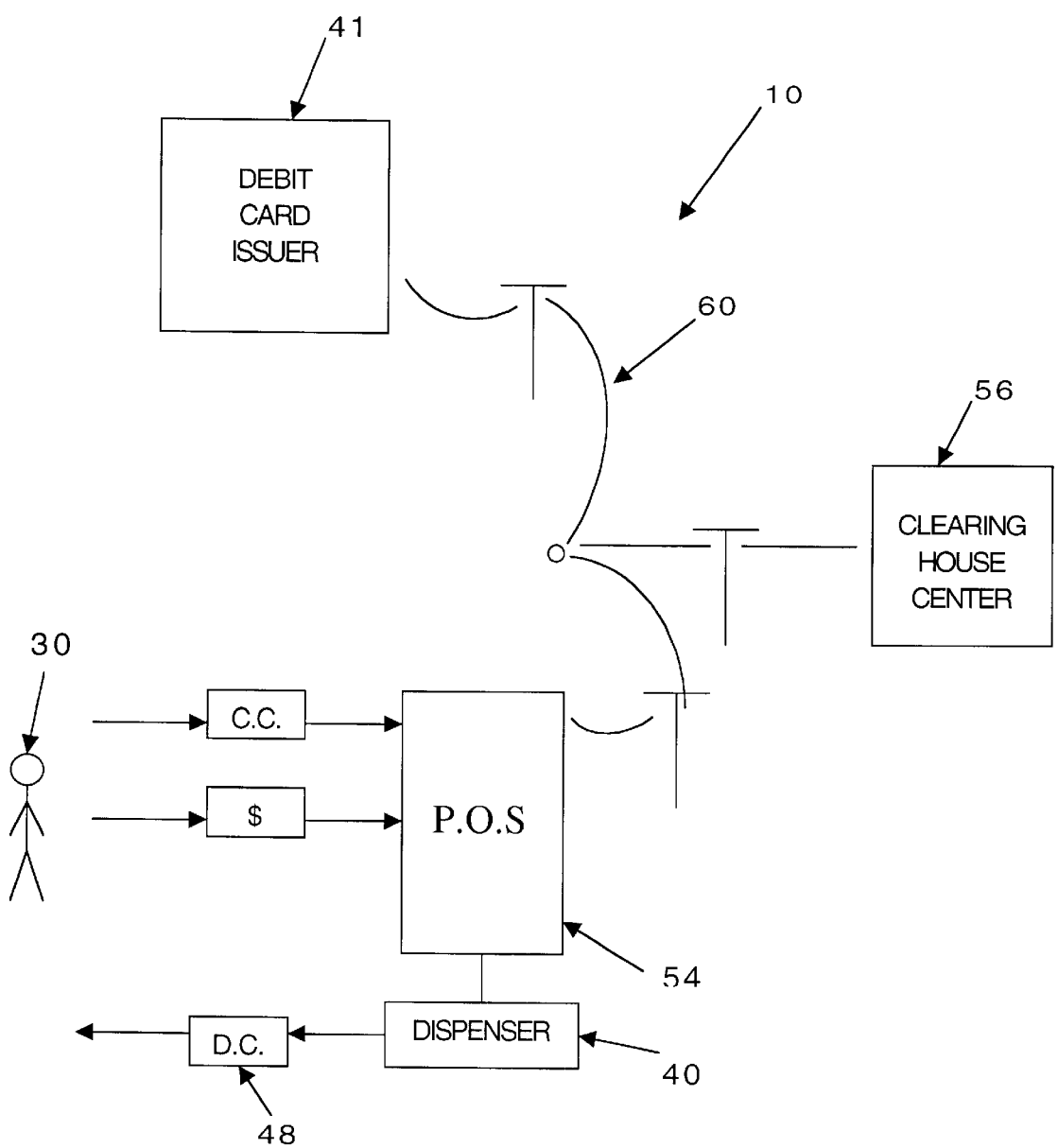
FIG. 1 represents the hardware used in the present invention.
Figure 2:
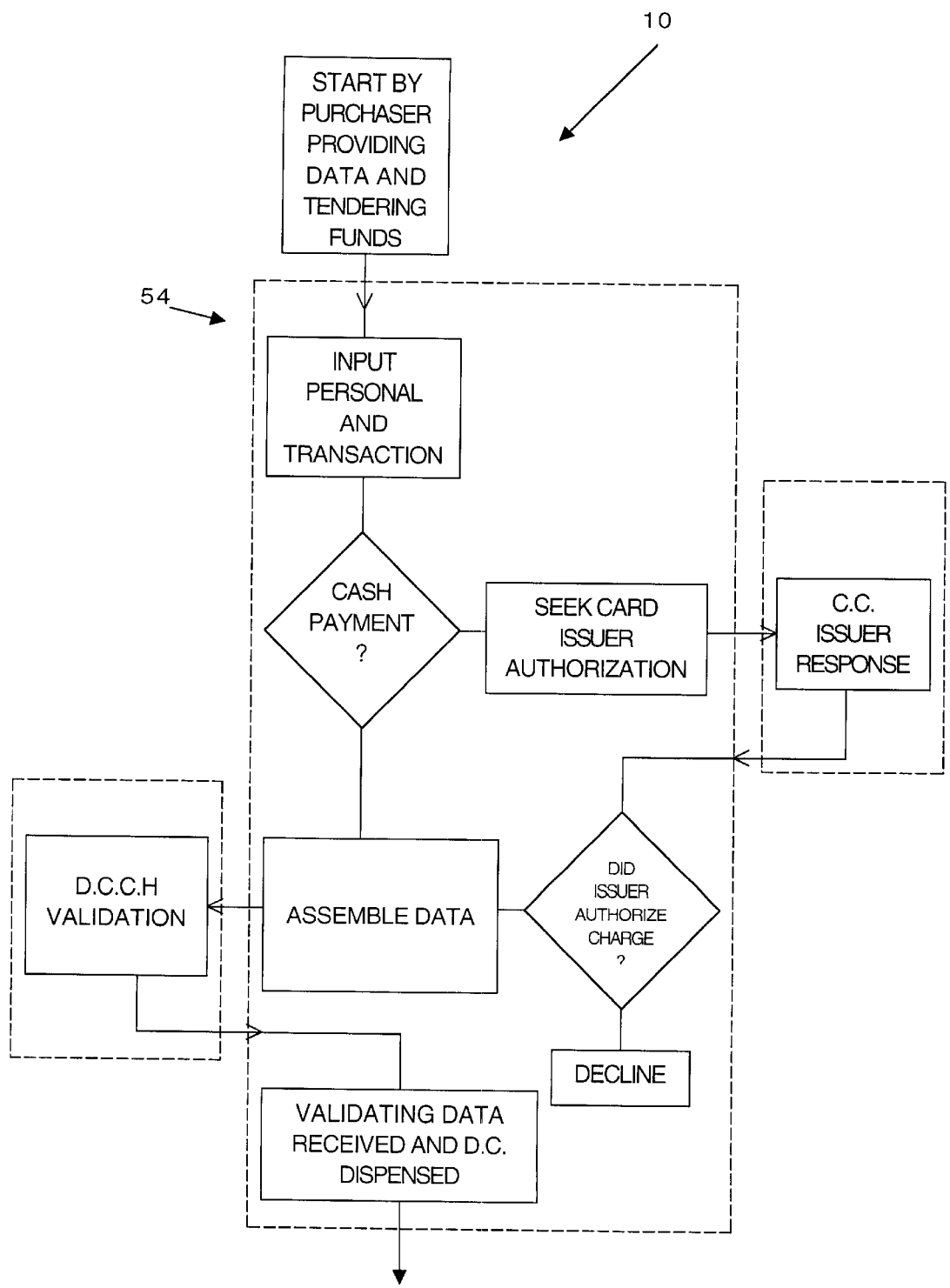
FIG. 2 is a flow chart summarizing the process steps followed in typical transactions.

Referring now to the drawings, where the present invention is generally referred to with numeral 10, it can be observed that it basically includes a system known as Point of Sales terminal(POS) 54 for controlling bank cards and it includes basically a keypad with numbers, letters, names, signs, graphics, with a sliding open side, all integrating point-of-sale terminal 54. The purchaser is represented with numeral 30. The merchant or dispenser of the card issuer 41, 40. The entity issuing the card 48 issuer 41. Comnputerized clearing house 56 and a telecommunications network 60 connecting them. For the purpose of this application, a purchaser 30 will be deemed a debit or credit card purchaser or holder. Dispenser will the merchant or the entity or place selling the card, and an issuer will be the entity or financial institution issuing the card. Dispenser 40 is loaded with three or more stacks of debit cards with a digital storage number 46 wherein a unique identifying serial number has been recorded, and identifies 48. POS terminal 54 with the necessary input and output hardware such as card charges and card debits 58, computer assembly 60 and associated storage assembly 50.

As shown in FIG. 1, a card purchaser 30 initiates the process when approaching a merchant offering the sale of prepaid debit cards through the Point-of-Sale terminals, requesting information regarding the different prepaid amounts of cards are available, once the purchaser decides the prepaid amount desired in the debit card to be purchased, depending on the jurisdiction's regulations, it may be obviated (bearer debit card) or it may be required the disclosure of the name, address, and the social security number. The purchaser 30 (or card holder) validates the funds in the card for further future use, through the input, of the always required to enter confidential four digits number or number and letters combined, the PIN (personal identification number), and his/her mother's maiden name 44, this last one for security purposes only (for replacement if the card is stolen or lost ). The issuer 41 of the card determines the amount of information it will require, or make optional, leaving latitude and flexibility for the purchaser as to how much information wants to disclose. The more information he or she discloses the more secure the debit card will be. Adding a second PIN number the purchaser can have the ability to design the terms of withdrawal from the debit card to fit his or her objectives. The information entered by the debit card purchaser is stored in storage assembly number 50 through computer assembly 60 for consequent transmission to clearinghouse 56, as shown in FIG. 1.

The following step pertains to entering information about the transaction such as the amount to be deposited and method of payment (cash, from a bank card). If the transaction is cash the merchant collects the cash as if it is a merchandise or paying for services routine transaction but entering the being purchased debit card issuing bank's ID number, right after the purchaser obtains the "virgin" not validated debit card for the amount he or she has prepaid minus a small processing % fee. A net prepaid amount is credited, and the debit card is slid into 54 (POS) this time as a credit charge of the net prepaid amount. The transaction is similar to a purchaser of merchandise or services asking for the refund (credit) to his or her debit card for whatever reason.

If more than one card are dispensed to the same purchaser, then the serial numbers will be linked to each other with the software making them look as if they were only one number. In this manner, a card purchaser may give one or more cards to others (traveling salesman, child in college, away from home, etc.) who will be able to use the debit card within the available line of credit. The card purchaser can then reload the debit card for the others' remote usage, thus effectively constituting an instantaneous transfer of funds.

The particulars of the user and the transaction, as well as the serial number(s) being dispensed, will be assembled in the predetermined manner and forwarded through network 60 clearing house 56, and through the existing facilities provided by the point-of-sale terminals.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for dispensing and validating prepaid debit and credit cards, comprising:

A) a point-of-sale assembly including first computer means with associated first storage means that further include first input and output means for entering information from a user pertaining to his or her particulars and the particulars of the transaction in said first storage means, said first input means includes a keypad assembly, a bill acceptance port and a credit/debit card charge assembly and further including means for validating the funds made available through said input means so that a line of credit is computed by said first computer means and stored in said first storage means with a validation signal and a block of information is assembled and ready for transmission;

B) means for dispensing at least one debit card for each transaction, and each of said debit cards including means for storing a unique identification number, and said debit cards being dispensed only after a first predetermined number of conditions have been met and said validation signal is received from said point of sale assembly; and C) a remotely located computerized clearing house assembly, including second computer means with associated second storage means, second input and output means for receiving and sending said block of information from and to said point of sale assembly and said second storage means further including data and instructions to process said block of information so that a line of credit is entered for each of said identification numbers.

2. The system set forth in claim 1, wherein the instructions and data in said second storage means permit a user to link more than one of said identification numbers of said debit cards to one line of credit thereby permitting more than one users to simultaneously access said credit line.

3. The system set forth in claim 2 wherein the instructions and data in said second storage means permit an issuer to affect the line of credit of the users upon the occurrence of a second number of predetermined conditions.

4. The system set forth in claim 3 wherein said second number of predetermined conditions includes the passage of time with unused balances.

5. The system set forth in claim 4 wherein the users can send and receive funds through the use of linked debit cards over a network of remotely distributed point of sale assemblies.

6. The system set forth in claim 5 wherein said line of credit is calculated by an issuer in one or more preselected foreign currencies.

7. The system set forth in claim 6 wherein a predetermined number of incentives are added to said line of credit, selectively, upon the occurrence of said second number of predetermined conditions.

* * * * *